US008810079B2

(12) United States Patent
Han et al.

(10) Patent No.: US 8,810,079 B2
(45) Date of Patent: Aug. 19, 2014

(54) BATTERY PACK AND UNINTERRUPTIBLE POWER SUPPLY HAVING THE SAME

(75) Inventors: Jung-Yup Han, Yongin-si (KR); No-Hyun Kwag, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 966 days.

(21) Appl. No.: 12/913,712

(22) Filed: Oct. 27, 2010

(65) Prior Publication Data

US 2011/0127835 A1 Jun. 2, 2011

(30) Foreign Application Priority Data

Nov. 27, 2009 (KR) .................. 10-2009-0115917

(51) Int. Cl.
*H02J 7/00* (2006.01)
(52) U.S. Cl.
USPC .......................................... 307/150
(58) Field of Classification Search
USPC .......................................... 307/150
See application file for complete search history.

(56) References Cited

U.S. PATENT DOCUMENTS

| 5,378,552 A * | 1/1995 | Dixon, Jr. ................. 429/91 |
| 2003/0054240 A1* | 3/2003 | Aronsson .................. 429/157 |
| 2005/0008931 A1* | 1/2005 | Axelrod ................... 429/97 |
| 2007/0238018 A1 | 10/2007 | Lee et al. |
| 2008/0111425 A1 | 5/2008 | Chang |

FOREIGN PATENT DOCUMENTS

| JP | 11-339770 | 12/1999 |
| JP | 2000-100464 | 4/2000 |
| JP | 2001-313018 A | 11/2001 |
| JP | 3134547 U | 8/2007 |
| JP | 2008-028684 | 2/2008 |
| JP | 2009-517833 A | 4/2009 |
| KR | 10-2007-0100555 A | 10/2007 |
| KR | 10-2007-0104692 | 10/2007 |
| KR | 10-2008-0027504 A | 3/2008 |
| KR | 10-2008-0036259 A | 4/2008 |
| KR | 10-2009-0000301 | 1/2009 |
| KR | 10-2009-0048863 | 5/2009 |
| WO | WO 2007/064097 A1 | 6/2007 |
| WO | WO 2008/018714 | 2/2008 |

OTHER PUBLICATIONS

Korean Office Action dated Apr. 7, 2011 for Korean Patent Application No. KR 10-2009-0115917 which corresponds to captioned U.S. Appl. No. 12/913,712.
Korean Registration Determination Certificate dated Oct. 28, 2011 for Korean Patent Application No. KR 10-2009-0115917 which corresponds to captioned U.S. Appl. No. 12/913,712.

* cited by examiner

*Primary Examiner* — Daniel Cavallari
(74) *Attorney, Agent, or Firm* — Knobbe, Martens, Olson & Bear, LLP

(57) ABSTRACT

Provided are battery packs capable of preventing electrical shorts due to incorrect arrangement of polarities of the battery packs during assembly of an uninterruptible power supply (UPS) having the battery packs and a UPS having the battery packs. The battery pack includes: a casing housing a plurality of cells; first and second terminals arranged to protrude outwardly from a first surface of the casing and having opposite polarities; a first attachment unit formed on a second surface of the casing; and a second attachment unit formed on a third surface of the casing, disposed opposite the second surface of the casing, wherein the first attachment unit and the second attachment unit are not symmetrical to each other.

25 Claims, 9 Drawing Sheets

BATTERY PACK AND UNINTERRUPTIBLE POWER SUPPLY HAVING THE SAME

CROSS-REFERENCE TO RELATED APPLICATION

This application claims the benefit of Korean Patent Application No. 10-2009-0115917, filed Nov. 27, 2009, in the Korean Intellectual Property Office, the disclosure of which is incorporated herein by reference.

BACKGROUND

1. Field

Aspects of the present invention relate to a battery pack and an uninterruptible power supply (UPS) having the same.

2. Description of the Related Art

An uninterruptible power supply (UPS) is a device supplying power to a load even if a power failure occurs. A UPS is used as a buffer between a commercially supplied power and an electrical load requiring continuous power supply. Such a UPS stores power in a storage battery during commercial power supply, and stably supplies safe power of excellent quality stored in the storage battery to equipment in during a power failure or a failure of the power supply input terminal of the equipment.

Such a UPS includes a rectifier, an inverter, and a battery system. The capacity of a battery system in a UPS varies according to types of equipment to which power is to be supplied in during a power failure. Generally, a large capacity battery system is used for supporting large-scale manufacturing equipment and computer systems.

SUMMARY

Aspects of the present invention include battery packs capable of preventing electrical shorts due to incorrect arrangement of polarities of the battery packs during assembly of an uninterruptible power supply (UPS) having the battery packs and a UPS having the battery packs.

According to an aspect of the present invention, a battery pack includes a casing housing a plurality of cells; first and second terminals arranged to protrude outwardly from a first surface of the casing and having opposite polarities; a first attachment unit formed on a second surface of the casing; and a second attachment unit formed on a third surface of the casing, disposed opposite the second surface of the casing, wherein the first attachment unit and the second attachment unit are not symmetrical to each other.

According to another aspect of the present invention, the first attachment unit may protrude outwardly from the second surface of the casing, and the second attachment unit may protrude outwardly from the third surface of the casing.

According to another aspect of the present invention, the first attachment unit and the second attachment unit may have different shapes or different sizes.

According to another aspect of the present invention, a width of the first attachment unit may be different from a width of the second attachment unit.

According to another aspect of the present invention, the width of either of the first attachment unit or the second attachment unit may be greater than the width of the other of the first attachment unit or the second attachment unit.

According to another aspect of the present invention, a height of the first attachment unit may be different from a height of the second attachment unit.

According to another aspect of the present invention, the height of either of the first attachment unit or the second attachment unit may be greater than the height of the other of the first attachment unit or the second attachment unit.

According to another aspect of the present invention, the first attachment unit may be a groove in the second surface, and the second attachment unit may be a groove in the third surface.

According to another aspect of the present invention, the first attachment unit and the second attachment unit may have different shapes or different sizes.

According to another aspect of the present invention, a depth of either of the first attachment unit or the second attachment unit may be greater than a depth of the other of the first attachment unit or the second attachment unit.

According to another aspect of the present invention, a width of either of the first attachment unit or the second attachment unit may be greater than a width of the other of the first attachment unit or the second attachment unit.

According to another aspect of the present invention, the first attachment unit may protrude outwardly from the second surface, and the second attachment unit may be a groove in the third surface.

According to another aspect of the present invention, the first attachment unit may be a groove in the third surface, and the second attachment unit may protrude outwardly from the third surface.

According to an aspect of the present invention, an uninterruptible power supply (UPS) includes at least one battery pack, each of which includes a casing housing a plurality of cells; first and second terminals that are arranged to protrude outwardly from a first surface of the casing and having opposite polarities; a first attachment unit formed on a second surface of the casing; and a second attachment unit formed on a third surface of the casing, disposed opposite the second surface of the casing, wherein the first attachment unit and the second attachment unit are not symmetrical to each other; and a housing including at least one storage unit for housing the at least one battery pack, wherein the at least one storage unit includes third attachment units and fourth attachment units, wherein the third attachment units and the fourth attachment units are respectively attached to the first and second attachment units and hold the at least one battery pack.

According to another aspect of the present invention, adjacent ones the third attachment units of the storage units arranged adjacent to each other may face different directions.

According to another aspect of the present invention, one of the third attachment units of one of the storage unit and one of the fourth attachment units of another one of the storage unit, which is adjacent to the one of the storage units, may face the same direction.

According to another aspect of the present invention, the first attachment unit may protrude outwardly from the second surface of the casing, the second attachment unit may protrude outwardly from the third surface of the casing, the third attachment units may be sunk into the housing in correspondence to the first attachment, such that the third attachment units are attachable to the first attachment unit, and the fourth attachment units may be sunk into the housing in correspondence to the second attachment, such that the fourth attachment units are attachable to the second attachment unit.

According to another aspect of the present invention, a width of the first attachment unit may be different from a width of the second attachment unit.

According to another aspect of the present invention, a height of the first attachment unit may be different from a height of the second attachment unit.

According to another aspect of the present invention, the first attachment unit may be a groove in the second surface, the second attachment unit may be a groove in the third surface, the third attachment unit may protrude outwardly from the housing in correspondence to the first attachment, such that the third attachment units are attachable to the first attachment unit, and the fourth attachment units may protrude outwardly from the housing in correspondence to the second attachment, such that the fourth attachment units are attachable to the second attachment unit.

According to another aspect of the present invention, a depth of the first attachment unit may be different from a depth of the second attachment unit.

According to another aspect of the present invention, a width of the first attachment unit may be different from a width of the second attachment unit.

According to another aspect of the present invention, the first attachment unit may protrude from the second surface, the second attachment unit may be a groove in the third surface, the third attachment units may be sunk into the housing in correspondence to the first attachment, such that the third attachment units are attachable to the first attachment unit, and the fourth attachment units may protrude outwardly from the housing in correspondence to the second attachment, such that the fourth attachment units are attachable to the second attachment unit.

According to another aspect of the present invention, the first attachment unit may be a groove in the second surface, the second attachment unit may protrude outwardly from the third surface, the third attachment units may protrude outwardly from the housing in correspondence to the first attachment, such that the third attachment units are attachable to the first attachment unit, and the fourth attachment units may be sunk into the housing in correspondence to the second attachment, such that the fourth attachment units are attachable to the second attachment unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
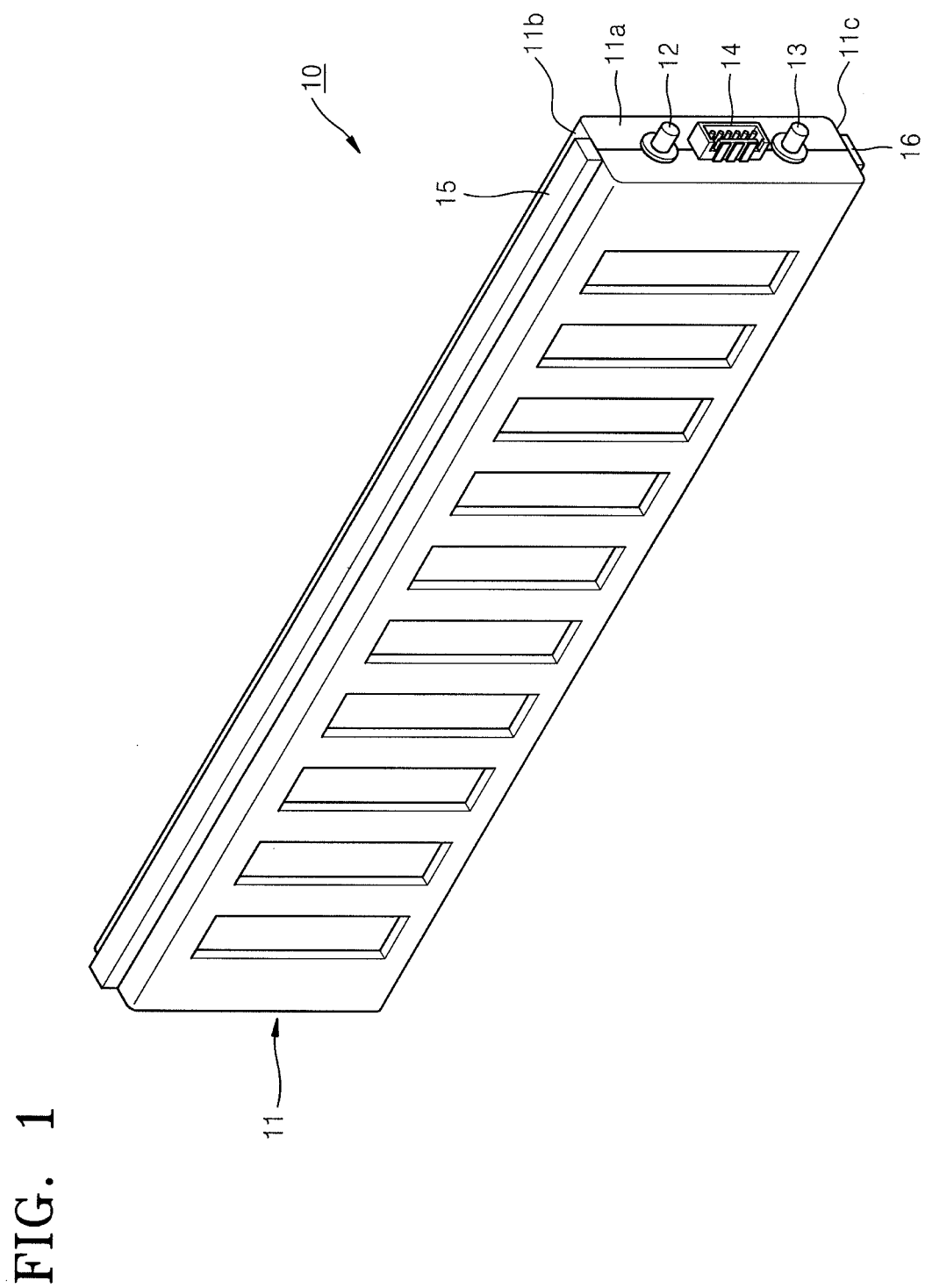
FIG. 1 is a perspective view of a battery pack according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
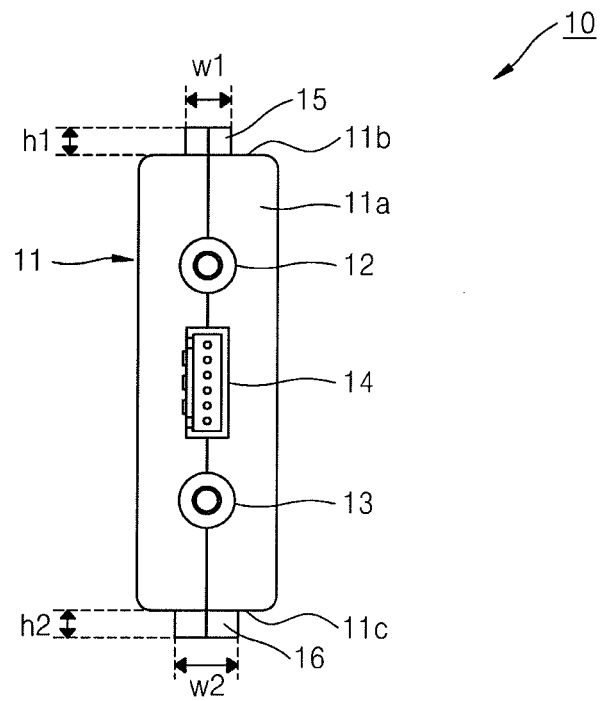
FIG. 2 is a front view of the battery pack of FIG. 1.

FIG. 1 is a perspective view of a battery pack 10 according to an embodiment of the present invention, and FIG. 2 is a front view of the battery pack 10 of FIG. 1. Referring to FIGS. 1 and 2, the battery pack 10, according to the present embodiment, includes a casing 11, a first terminal 12, a second terminal 13, and a data communication terminal 14.

The casing 11 houses cells (not shown). The casing 11 includes an attachment space of appropriate size according to a size and number of cells housed in the attachment space. The casing 11 has various shapes according to the size and number of cells housed in the casing 11. For example, the casing 11 has a hexahedral shape, as shown in FIG. 1. However, aspects of the present invention are not limited thereto, and the casing 11 may have other suitable shapes.

The first terminal 12, the second terminal 13, and the data communication terminal 14 are arranged on a first surface 11$a$ of the casing 11. A first attachment unit 15 is arranged on a second surface 11$b$ of the casing 11. A second attachment unit 16 is arranged on a third surface 11$c$, which faces the second surface 11$b$ of the casing 11.

The first terminal 12 and the second terminal 13 operate either to allow currents to flow from the cells to the outside or to allow a charging current to flow into the cells. The first terminal 12 and the second terminal 13 are arranged on the first surface 11$a$ of the casing 11. First ends of the first terminal 12 and the second terminal 13 are connected to tags electrically connecting cells within the casing 11. Second ends of the first terminal 12 and the second terminal 13 extend outside the casing 11. The first terminal 12 and the second terminal 13 have opposite polarities. If the first terminal 12 has a positive polarity, the second terminal 13 may have a negative polarity, and vice versa.

The data communication terminal 14 is arranged on the first surface 11$a$ of the casing 11. Data regarding temperatures or charging status of housed cells are transmitted to outside via the data communication terminal 14. The first attachment unit 15 and the second attachment unit 16 guide the battery pack 10 when the battery pack 10 is inserted into a UPS and fix a position of the battery pack 10 after the battery pack 10 is inserted into the UPS.

The first attachment unit 15 protrudes outwardly from the second surface 11$b$ of the casing 11. The second attachment unit 16 protrudes outwardly from the third surface 11$c$ of the casing 11 in a direction opposite from a direction in which the first attachment unit 15 protrudes. The first attachment unit 15 and the second attachment unit 16 shown in FIGS. 1 and 2 have hexahedral shapes. However, aspects of the present invention are not limited thereto, and shapes of the first attachment unit 15 and the second attachment unit 16 may vary.

The shapes and sizes of the first attachment unit 15 and the second attachment unit 16 may be different from each other. Referring to FIG. 2, a height h1 of the first attachment unit 15 is the same as the height h2 of the second attachment unit 16, but the width w1 of the first attachment unit 15 is less than the width w2 of the second attachment unit 16. However, aspects of the present invention are not limited thereto, and the width w1 of the first attachment unit 15 may be smaller than the width w2 of the second attachment unit 16. Since the shapes and sizes of the first attachment unit 15 and the second attachment unit 16 are different from each other, an electric short due to an incorrect connection of positive and negative polarities is prevented when a plurality of the battery packs 10 are inserted into a UPS.

Figure 9:
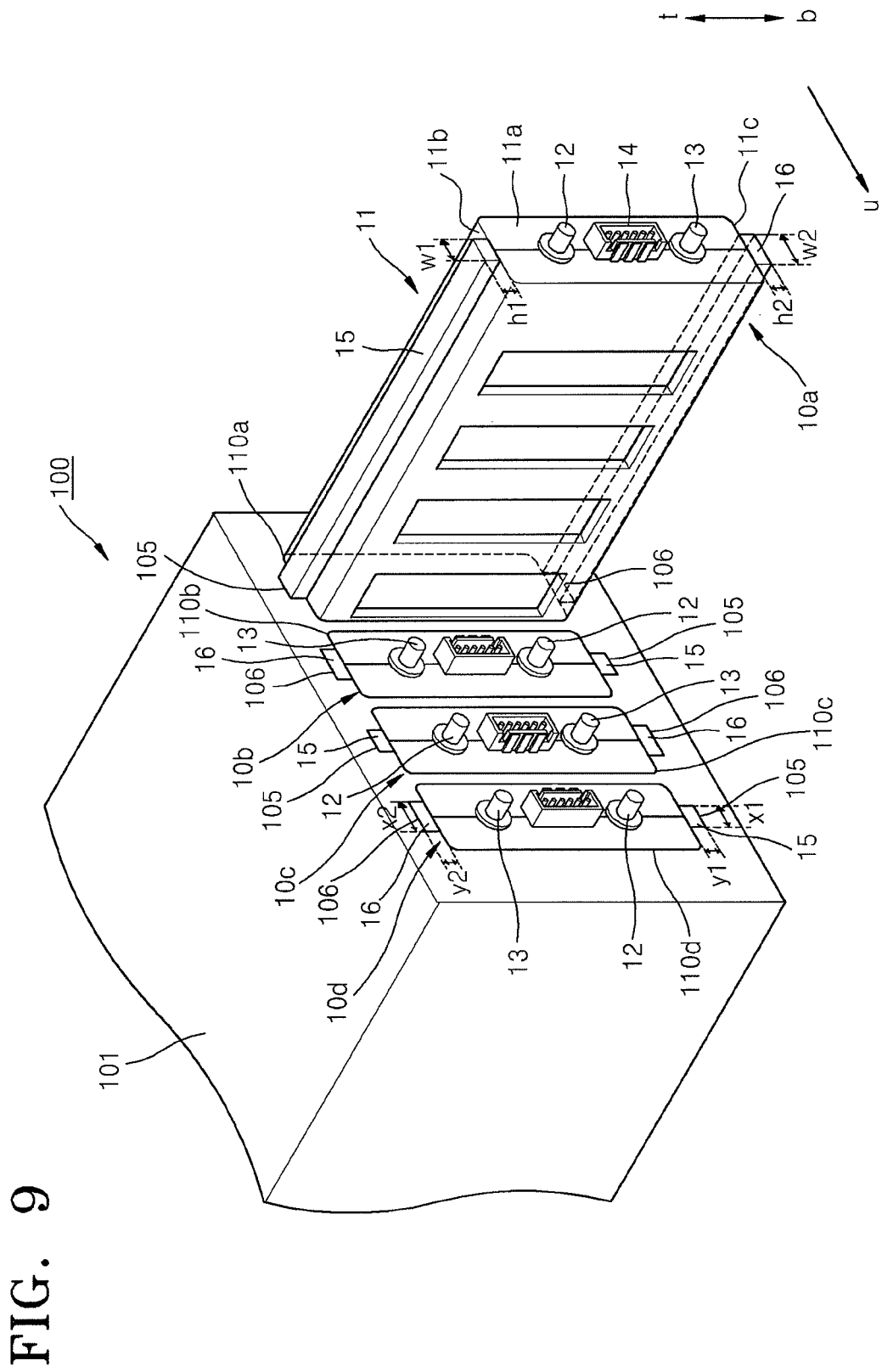
FIG. 9 is a perspective view of a UPS according to an embodiment of the present invention.

Referring to FIG. 9, the battery packs 10 are arranged in a line in a housing 101 of a UPS 100, such that the first and second terminals 12 and 13 of each of the battery packs 10 are exposed. Battery packs 10a, 10b, 10c, and 10d are electrically and mechanically connected to each other via busbars (not shown) connecting the first and second terminals 12 and 13. A busbar connects terminals of opposite polarities. For example, a busbar connects the first terminal 12 of the battery pack 10a and the second terminal 13 of the second battery pack 10b. For such a busbar connection, it is necessary to arrange the battery packs 10a and 10b in the housing 101 such that the first terminals 12 and the second terminals 13, which have opposite polarities, are alternately arranged along a one direction. If terminals of the same polarity are arranged in a line (e.g. both the first terminal 12 of the battery pack 10a and the first terminal 12 of the second battery pack 10b are arranged to face an upward direction t, terminals of the same polarity are connected via a busbar, and an electric short may occur. However, in the battery pack 10, the width w1 of the first attachment unit 15 and the width w2 of the second attachment unit 16 are different from each other. Therefore, according to an embodiment of the present invention, the battery packs 10 are not inserted such that terminals of the same polarity are adjacent to each other, and the battery packs 10 are inserted into the housing 101 such that terminals of opposite polarities are adjacent to each other.

Figure 3:
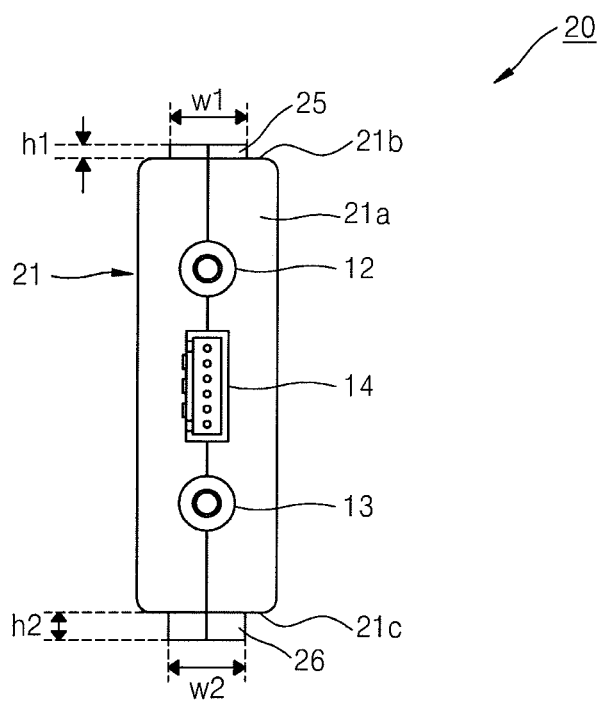
FIG. 3 is a front view of a battery pack according to another embodiment of the present invention.

FIG. 3 is a front view of a battery pack 20 according to another embodiment of the present invention. Referring to FIG. 3, the first terminal 12, the data communication terminal 14, and the second terminal 13 are arranged on a first surface 21a of a casing 21. Furthermore, a first attachment unit 25 is arranged on a second surface 21b of the casing 21, and a second attachment unit 26 is arranged on a third surface 21c of the casing 21. The battery pack 20, according to the present embodiment, is identical to the battery pack 10 of the previous embodiment, wherein the first attachment unit 25 and the second attachment unit 26 protrude outwardly from the casing 21. However, according to the present embodiment, the shapes of the first attachment unit 25 and the second attachment unit 26 are different from the shapes of the first attachment unit 15 and the second attachment unit 16 of the embodiment of FIG. 1. In other words, in the battery pack 20, according to the present embodiment, a width w1 of the first attachment unit 25 is the same as a width w2 of the second attachment unit 26, but the height h1 of the first attachment unit 25 is different from the height h2 of the second attachment unit 26. As shown in FIG. 3, a height h1 of the first attachment unit 25 is smaller than a height h2 of the second attachment unit 26, or vice versa.

Figure 4:
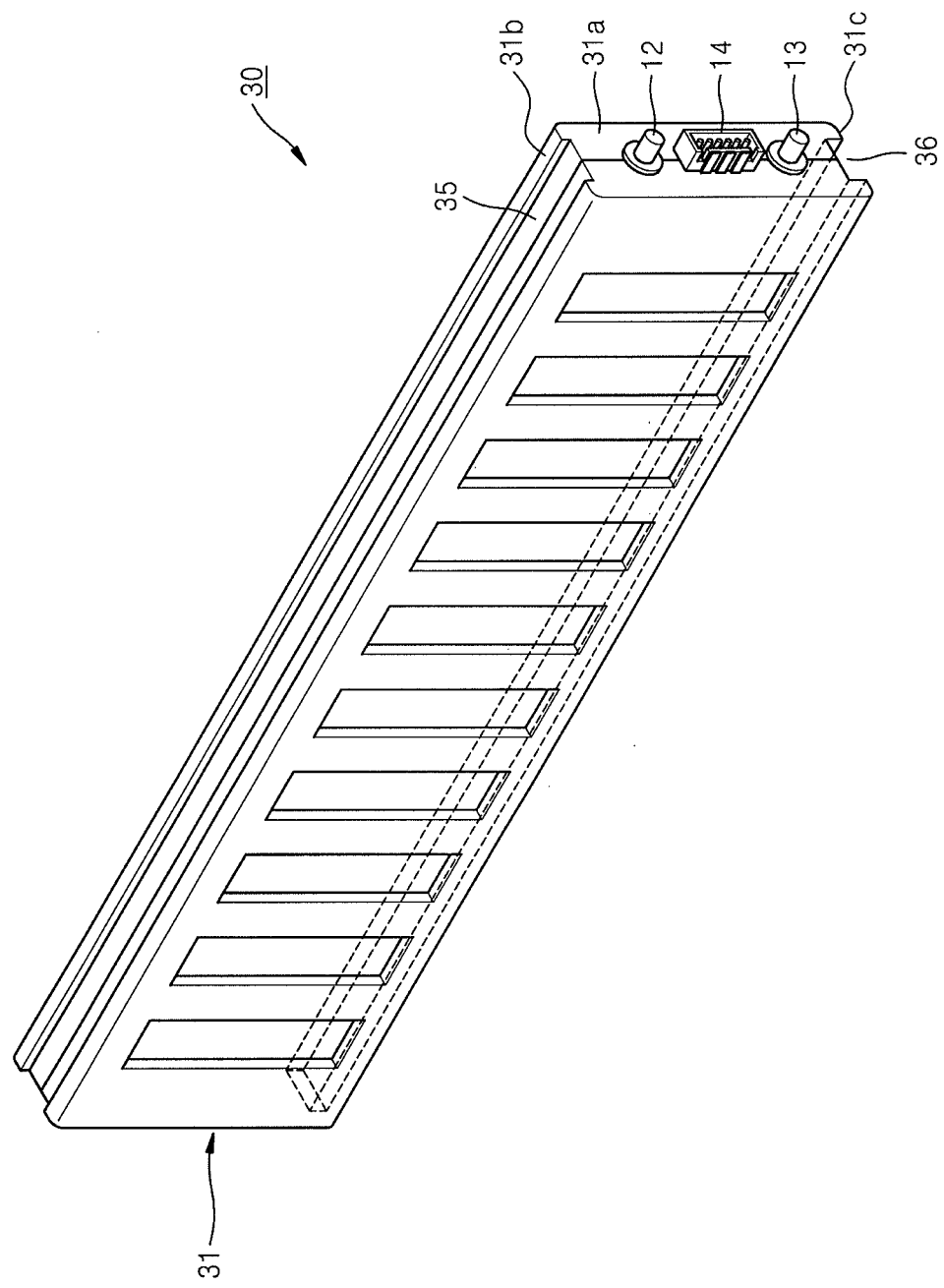
FIG. 4 is a perspective view of a battery pack according to another embodiment of the present invention.
Figure 5:
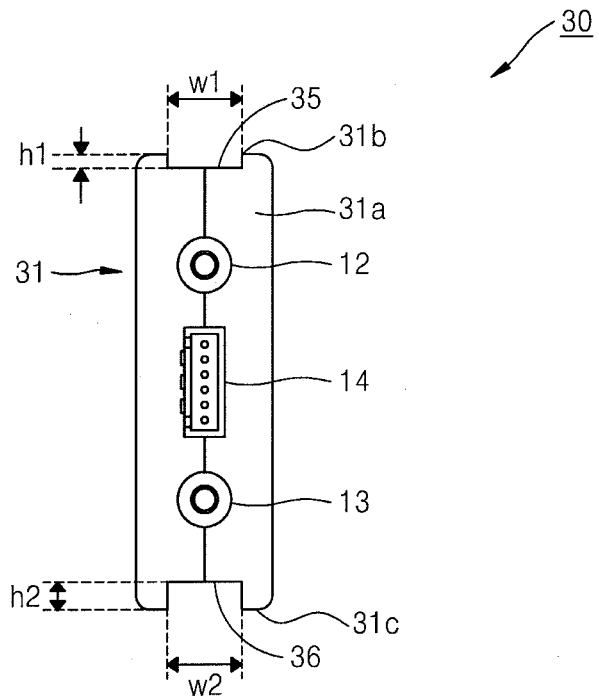
FIG. 5 is a front view of the battery pack of FIG. 4.

FIG. 4 is a perspective view of a battery pack 30 according to another embodiment of the present invention, and FIG. 5 is a front view of the battery pack 30 of FIG. 4. Referring to FIGS. 4 and 5, in the battery pack 30, according to the present embodiment, the first terminal 12, the data communication terminal 14, and the second terminal 14 are arranged on a first surface 31a of a casing 31.

A first attachment unit 35 is arranged on a second surface 31b of the casing 31, and a second attachment unit 36 is arranged on a third surface 31c of the casing 31. The first attachment unit 35 is a groove in the second surface 31b, and the second attachment unit 36 is a groove in the second surface 31c. The first attachment unit 35 and the second attachment unit 36 are differently shaped grooves. In other words, a depth h1 of the first attachment unit 35 and a depth h2 of the second attachment unit 36 are different from each other. Referring to FIG. 5, the depth h1 of the first attachment unit 35 is smaller than the depth h2 of the second attachment unit 36, or vice versa. A width w1 of the first attachment unit 35 is the same as a width w2 of the second attachment unit 36.

Figure 6:
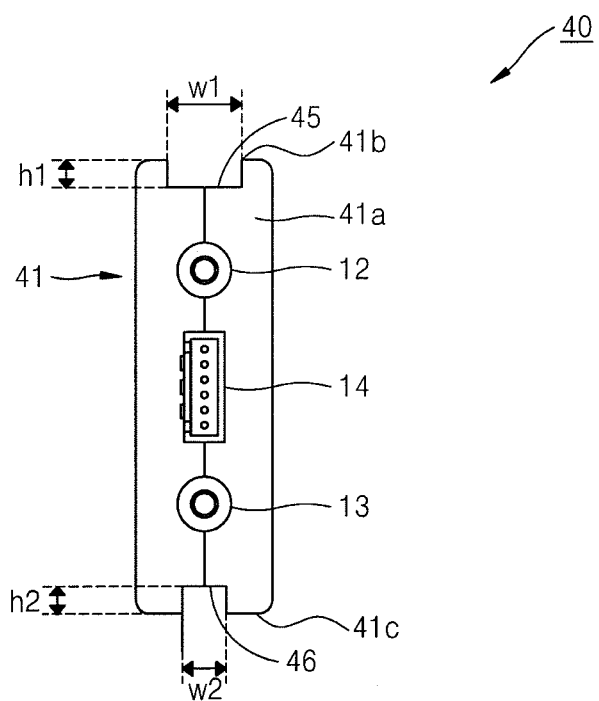
FIG. 6 is a front view of a battery pack according to another embodiment of the present invention.

FIG. 6 is a front view of a battery pack 40 according to another embodiment of the present invention. Referring to FIG. 6, in the battery pack 40 according to the present embodiment, the first terminal 12, the data communication terminal 14, and the second terminal 14 are arranged on a first surface 41a of a casing 41.

A first attachment unit 45 is arranged on a second surface 41b of the casing 41, and a second attachment unit 46 is arranged on a third surface 41c of the casing 41. Although the battery pack 40, according to the present embodiment, is identical to the battery pack 30 shown in FIG. 5, with the first attachment unit 45 and the second attachment unit 46 formed as grooves, the shapes of the first and second attachment units 45 and 46, according to the present embodiment are different from those of the first and second attachment units 35 and 36 according to the previous embodiment. In other words, although a depth h1 of the first attachment unit 45 and a depth h2 of the second attachment unit 46 are the same, a width w1 of the first attachment unit 45 is different from a width w2 of the second attachment unit 46. As shown in FIG. 6, the width w1 of the first attachment unit 45 is greater than the width w2 of the second attachment unit 46, or vice versa.

Figure 7:
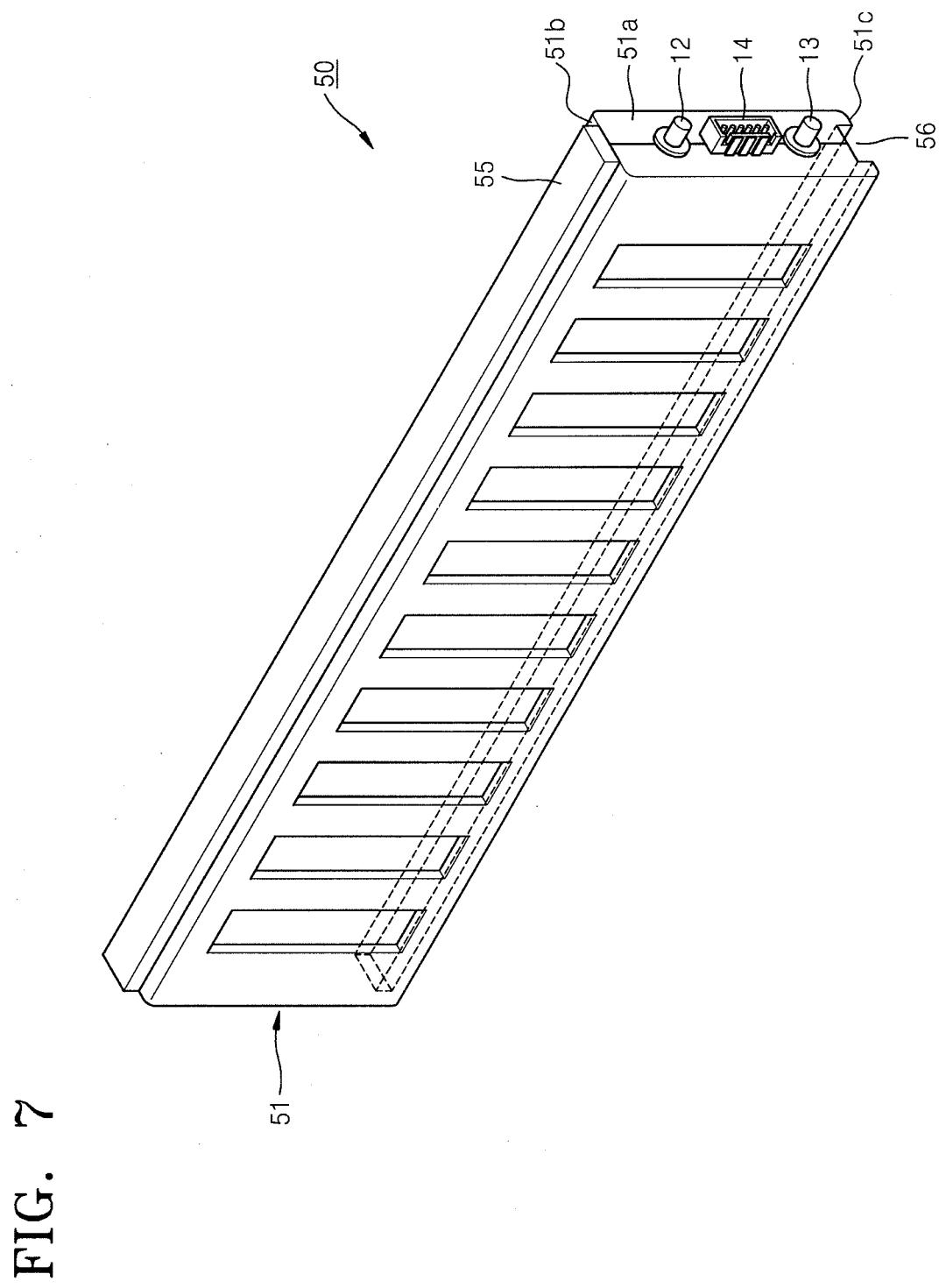
FIG. 7 is a perspective view of a battery pack according to another embodiment of the present invention.
Figure 8:
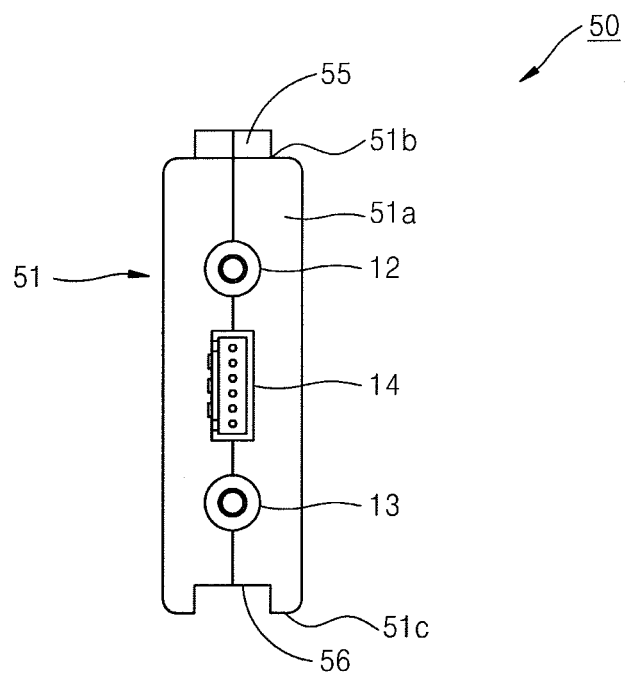
FIG. 8 is a front view of the battery pack of FIG. 7.

FIG. 7 is a perspective view of a battery pack 50, according to another embodiment of the present invention, and FIG. 8 is a front view of the battery pack 50 of FIG. 7. Referring to FIGS. 7 and 8, in the battery pack 50, according to the present embodiment, the first terminal 12, the data communication terminal 14, and the second terminal 13 are arranged on a first surface 51a of a casing 51. Furthermore, a first attachment unit 55 is arranged on a second surface 51b of the casing 51, and a second attachment unit 56 is arranged on a third surface 51c of the casing 51. The first attachment unit 55 protrudes outwardly from the second surface 51b of the casing 51, whereas the second attachment unit 56 is a groove in the third surface 51c.

FIG. 9 is a perspective view of a UPS 100 according to an embodiment of the present invention. Referring to FIG. 9, the UPS 100, according to the present embodiment, includes the housing 101 and the battery packs 10a, 10b, 10c, and 10d.

The housing 101 includes storage units 110a, 110b, 110c, and 110d housing the battery packs 10a, 10b, 10c, and 10d, respectively. Each of the storage units 110a, 110b, 110c, and 110d includes a third attachment unit 105 and a fourth attachment unit 106. Each of the third attachment units 105 and the fourth attachment units 106 are respectively attached to the first attachment units 15 and the second attachment units 16, so that the battery packs 10a, 10b, 10c, and 10d slide into and are housed in the housing 101. Furthermore, each of the third attachment units 105 and the fourth attachment units 106 hold the battery packs 10a, 10b, 10c, and 10d when the battery packs 10a, 10b, 10c, and 10d are housed in the housing 101.

In detail, the third attachment units 105 of the storage units 110a, 110b, 110c, and 110d are attached to the first attachment units 15 of the battery packs 10a, 10b, 10c, and 10d, respectively. The fourth attachment units 106 of the storage units 110a, 110b, 110c, and 110d are attached to the second attachment units 16 of the battery packs 10a, 10b, 10c, and 10d, respectively. The third attachment units 105 and the fourth attachment units 106 are formed to have the shapes corresponding to the shapes of the first attachment units 15 and the second attachment units 16. Thus, the third attachment units 105 and the fourth attachment units 106 are attached to the first attachment units 15 and the second attachment units 16, respectively.

Referring to FIG. 9, the first attachment units 15 and the second attachment units 16 protrude outwardly from the second surface 11b and the third surface 11c, respectively. Therefore, the third attachment units 105 and the fourth attachment units 106 are sunk into the housing 101 in correspondence to the shapes of the first attachment units 15 and the second attachment units 16. In particular, although a height h1 of the first attachment unit 15 is the same as a height h2 of the second attachment unit 16, a width w1 of the first attachment unit 15 is smaller than a width w2 of the second attachment unit 16. Therefore, although depths y1 and y2 of the third attachment unit 105 and the fourth attachment unit 106 are the same, a width x1 of the third attachment unit 105 may be smaller than a width x2 of the fourth attachment unit 106.

Furthermore, the depths y1 and y2 of the third attachment unit 105 and the fourth attachment unit 106 are the same as respective heights h1 and h2 of the first attachment unit 15 and the second attachment unit 16. Also, the width x1 of the third attachment unit 105 is the same as the width w1 of the first attachment unit 15, and the width x2 of the fourth attachment unit 106 is the same as the width w2 of the second attachment unit 16. However, aspects of the present invention are not limited thereto, and the width x1 and the depth y1 of the third attachment unit 105 may be respectively greater than the width w1 and the height h1 of the first attachment unit 15, and the width x2 and the depth y2 of the fourth attachment unit 106 may be respectively greater than the width w2 and the height h2 of the second attachment unit 16. Thus, the first attachment unit 15 and the second attachment unit 16 are respectively attached to the third attachment unit 105 and the fourth attachment unit 106.

The third attachment units 105 and the fourth attachment units 106 of the storage units 110a, 110b, 110c, and 110d are arranged to face different directions. In detail, the third attachment unit 105 of the storage unit 110a faces an upward direction t of the housing 101. The fourth attachment unit 106 of the storage unit 110a faces a downward direction b of the housing 101. On the other hand, the third attachment unit 105 of the storage unit 110b, which is adjacent to the storage unit 110a, faces the downward direction b of the housing 101, whereas the fourth attachment unit 106 of the storage unit 110b faces the upward direction t of the housing 101. Furthermore, the third attachment unit 105 and the fourth attachment unit 106 of the storage unit 110c face the upward direction t and the downward direction b of the housing 101, respectively.

In other words, the third attachment unit 105 of the storage unit 110a, the fourth attachment unit 106 of the storage unit 110b, the third attachment unit 105 of the storage unit 110c, and the fourth attachment unit 106 of the storage unit 110d face the upward direction t. On the other hand, the fourth attachment unit 106 of the storage unit 110a, the third attachment unit 105 of the storage unit 110b, the fourth attachment unit 106 of the storage unit 110c, and the third attachment unit 105 of the storage unit 110d face the downward direction b. The third attachment units 105 and the fourth attachment units 106 are alternately arranged to face the upward direction t, whereas the fourth attachment units 106 and the third attachment units 105 are alternately arranged to face the downward direction b.

As described above, in the UPS 100, according to the present embodiment, the third attachment units 105 and the fourth attachment units 106 have different shapes and are alternately arranged. Thus upper ends and lower ends of the battery packs 10a, 10b, 10c, and 10d are alternately arranged with respect to adjacent battery packs 10a, 10b, 10c, and 10d. Therefore, the first and second terminals 12 and 13 of opposite polarities are alternately arranged. In other words, the first attachment unit 15 and the second attachment unit 16 of the battery pack 10a are respectively attached to the third attachment unit 105 and the fourth attachment unit 106. The battery pack 10a is disposed in the storage unit 110a, in which the third attachment unit 105 faces the upward direction t and the fourth attachment unit 106 faces the downward direction b. Thus the battery pack 10a is arranged such that the first terminal 12 is disposed above a data communication terminal 14 in the upward direction t and the second terminal 13 is disposed below the data communication terminal 14 in the downward direction b.

Furthermore, the first attachment unit 15 and the second attachment unit 16 of the battery pack 10b are respectively attached to the third attachment unit 105 and the fourth attachment unit 106. The battery pack 10b is disposed in the storage unit 110b, in which the third attachment unit 105 protrudes in the downward direction b and the fourth attachment unit 106 protrudes in the upward direction t. Thus the battery pack 10b is arranged such that the first terminal 12 is disposed below a data communication terminal 14 in the downward direction b and the second terminal 13 is disposed above the data communication terminal 14 in the upward direction t. In the same regard, the battery pack 10c is arranged such that the first terminal 12 and the second terminal 13 of the battery pack 10c are disposed so as to be opposite in direction as that of the first and second terminals 12 and 13 of the battery pack 10b. Also, the battery pack 10d is arranged such that the first terminal 12 and the second terminal 13 are disposed so as to be opposite in direction as that of the first and second terminals 12 and 13 of the battery pack 10c.

Therefore, in the UPS 100, according to the present embodiment, the first terminals 12 and the second terminals 13 of the battery packs 10a, 10b, 10c, and 10d are alternately arranged to be disposed in opposite directions with respect to the first and second terminals 12 and 13 of adjacent ones of the battery packs 10a, 10b, 10c, and 10d.

The first and second terminals 12 and 13 of opposite polarities of the battery packs 10a, 10b, 10c, and 10d, which are respectively housed in the storage units 110a, 110b, 110c, and 110d, are connected to each other via busbars (not shown), which are formed of a conductive metal. In other words, the first terminal 12 of the battery pack 10a is connected to the second terminal 13 of the adjacent battery pack 10b, via a busbar, and the first terminal 12 of the battery pack 10b is connected to the second terminal 13 of the adjacent battery pack 10c, via a busbar. Thus, adjacent battery packs 10a, 10b, 10c, and 10d are connected in series. In the UPS 100, according to the present embodiment, due to the differences in the shapes and arrangements of the first through fourth attachment units 15, 16, 105, and 106, the battery packs 10a, 10b, 10c, and 10d are housed in the housing 101 such that the polarities of the terminals 12 and 13 of each of the battery packs 10a, 10b, 10c, and 10d are alternately arranged. Therefore, the battery packs 10a, 10b, 10c, and 10d are easily housed in the housing 101 without confirming polarities of each of the battery packs 10a, 10b, 10c, and 10d. Furthermore, the battery packs 10a, 10b, 10c, and 10d are prevented from being housed in the housing 101 such that the terminals 12 and 13 having the same polarity are arranged adjacent to each other. Thus electric shorts due to incorrect connection of terminals having the same polarity may be prevented.

Figure 10:
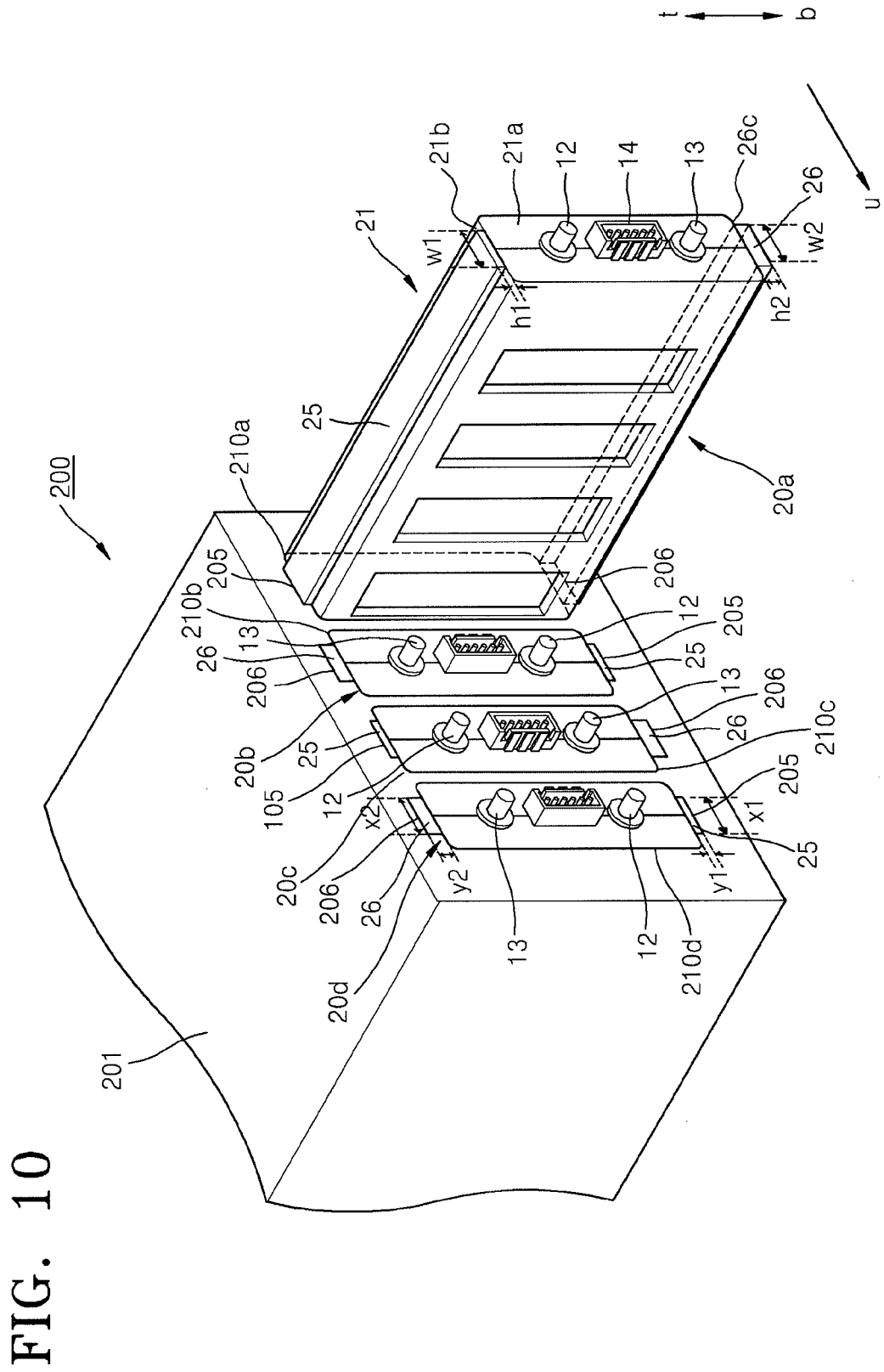
FIG. 10 is a perspective view of a UPS according to another embodiment of the present invention.

FIG. 10 is a perspective view of a UPS 200 according to another embodiment of the present invention. Referring to FIG. 10, the UPS 200, according to the present embodiment, includes a housing 201 and battery packs 20a, 20b, 20c, and 20d.

The housing 201 includes storage units 210a, 210b, 210c, and 210d housing the battery packs 20a, 20b, 20c, and 20d, respectively. Each of the storage units 210a, 210b, 210c, and 210d includes a third attachment unit 205 and a fourth attachment unit 206. The third attachment units 205 and the fourth attachment units 206 are respectively attached to the first attachment units 25 and the second attachment units 26 of the battery packs 20a, 20b, 20c, and 20d. The third attachment units 205 are formed to be attached to the first attachment units 25, whereas the fourth attachment units 206 are formed to be attached to the second attachment units 26.

Referring to FIG. 10, the first attachment units 25 and the second attachment units 26 protrude outwardly from second surfaces 21b and third surfaces 21c, respectively. Therefore, the third attachment units 205 and the fourth attachment units 206 are sunk into the housing 201 in correspondence to shapes of the first attachment units 25 and the second attachment units 26. A height h1 of each of the first attachment units 25 is smaller than a height h2 of each of the second attachment units 26, whereas a width w1 of each of the first attachment units 25 is the same as a width w2 of each of the second attachment units 26. Therefore, widths x1 and x2 of the third attachment units 205 and the fourth attachment unit 206, respectively, are the same, whereas a depth y1 of each of the third attachment units 205 is smaller than a depth y2 of each of the fourth attachment unit 206. However, aspects of the present invention are not limited thereto. For example, the width x1 and the depth y1 of each of the third attachment units 205 may be respectively greater than the width w1 and the height h1 of each of the first attachment units 25, and the width x2 and the depth y2 of each of the fourth attachment units 206 may be respectively greater than the width w2 and the height h2 of each of the second attachment units 26. Thus, the first attachment units 25 and the second attachment units 26 are respectively attached to the third attachment units 205 and the fourth attachment units 206.

The third attachment units 205 and the fourth attachment units 206 of the storage units 210a, 210b, 210c, and 210d are arranged to face different directions. In detail, the third attachment unit 205 of the storage unit 210a faces an upward direction t of the housing 201, whereas the fourth attachment unit 206 of the storage unit 210a faces the downward direction b of the housing 201. On the other hand, the third attachment unit 205 of the storage unit 210b, which is adjacent to the storage unit 210a, faces the downward direction b, whereas the fourth attachment unit 206 of the storage unit 210b faces the upward direction t. Furthermore, the third attachment unit 205 and the fourth attachment unit 206 of the storage unit 210c face the upward direction t and the downward direction b of the housing 201, respectively.

In other words, the third attachment unit 205 of the storage unit 210a, the fourth attachment unit 206 of the storage unit 210b, the third attachment unit 205 of the storage unit 210c, and the fourth attachment unit 206 of the storage unit 210d face the upward direction t, whereas the fourth attachment unit 206 of the storage unit 210a, the third attachment unit 205 of the storage unit 210b, the fourth attachment unit 206 of the storage unit 210c, and the third attachment unit 205 of the storage unit 210d face the downward direction b. In other words, the third attachment units 205 and the fourth attachment units 206 are alternately arranged to face the upward direction t, whereas the fourth attachment units 206 and the third attachment units 205 are alternately arranged to face the downward direction b.

As described above, in the UPS 200, according to the present embodiment, the third attachment units 205 and the fourth attachment units 206 have different shapes and are alternately arranged. Thus upper ends and lower ends of the battery packs 20a, 20b, 20c, and 20d are alternately arranged. Therefore, the first and second terminals 12 and 13 having opposite polarities are alternately arranged. In other words, the first attachment unit 25 and the second attachment unit 26 of the battery pack 20a are respectively attached to the third attachment unit 205 and the fourth attachment unit 206. Thus the battery pack 20a is arranged such that the first terminal 12 is disposed above a data communication terminal 14 in an upward direction t and the second terminal 13 is disposed below the data communication terminal 14 in the downward direction b.

Furthermore, the first attachment unit 25 and the second attachment unit 26 of the battery pack 20b are respectively attached to the third attachment unit 205 and the fourth attachment unit 206. Thus the battery pack 20b is arranged such that the first terminal 12 is disposed above a data communication terminal 14 in an upward direction t and the second terminal 13 is disposed below the data communication terminal 14 in the downward direction b. In the same regard, the battery pack 20c is arranged such that the first terminal 12 and the second terminal 13 of the battery pack 20c are disposed in an opposite orientation as that of the first terminal 12 and the second terminal 13 of the battery pack 20b. Additionally, the battery pack 20d is arranged such that the first terminal 12 and the second terminal 13 of the battery pack 20d are oriented similarly to the first terminal 12 and the second terminal 13 of the battery pack 20b.

Therefore, in the UPS 200, according to the present embodiment, the first terminals 12 and the second terminals 13 of the battery packs 20a, 20b, 20c, and 20d are alternately arranged with respect to the first terminals 12 and the second terminals 13 of adjacent ones of the battery packs 20a, 20b, 20c, and 20d.

Accordingly, in the UPS 200, according to the present embodiment, due to the differences in the shapes and arrangements of the first through fourth attachment units 25, 26, 205, and 206, the battery packs 20a, 20b, 20c, and 20d are housed in the housing 201 such that the polarities of the terminals 12 and 13 of the respective battery packs 20a, 20b, 20c, and 20d are alternately arranged. Therefore, the battery packs 20a, 20b, 20c, and 20d are easily housed in the housing 201 without confirming polarities of each of the battery packs 20a, 20b, 20c, and 20d. Furthermore, the battery packs 20a, 20b, 20c, and 20d are prevented from being housed in the housing 201 such that the terminals 12 and 13 having the same polarity are arranged adjacent to each other. Thus electric shorts due to incorrect connection of terminals having the same polarity is prevented.

Figure 11:
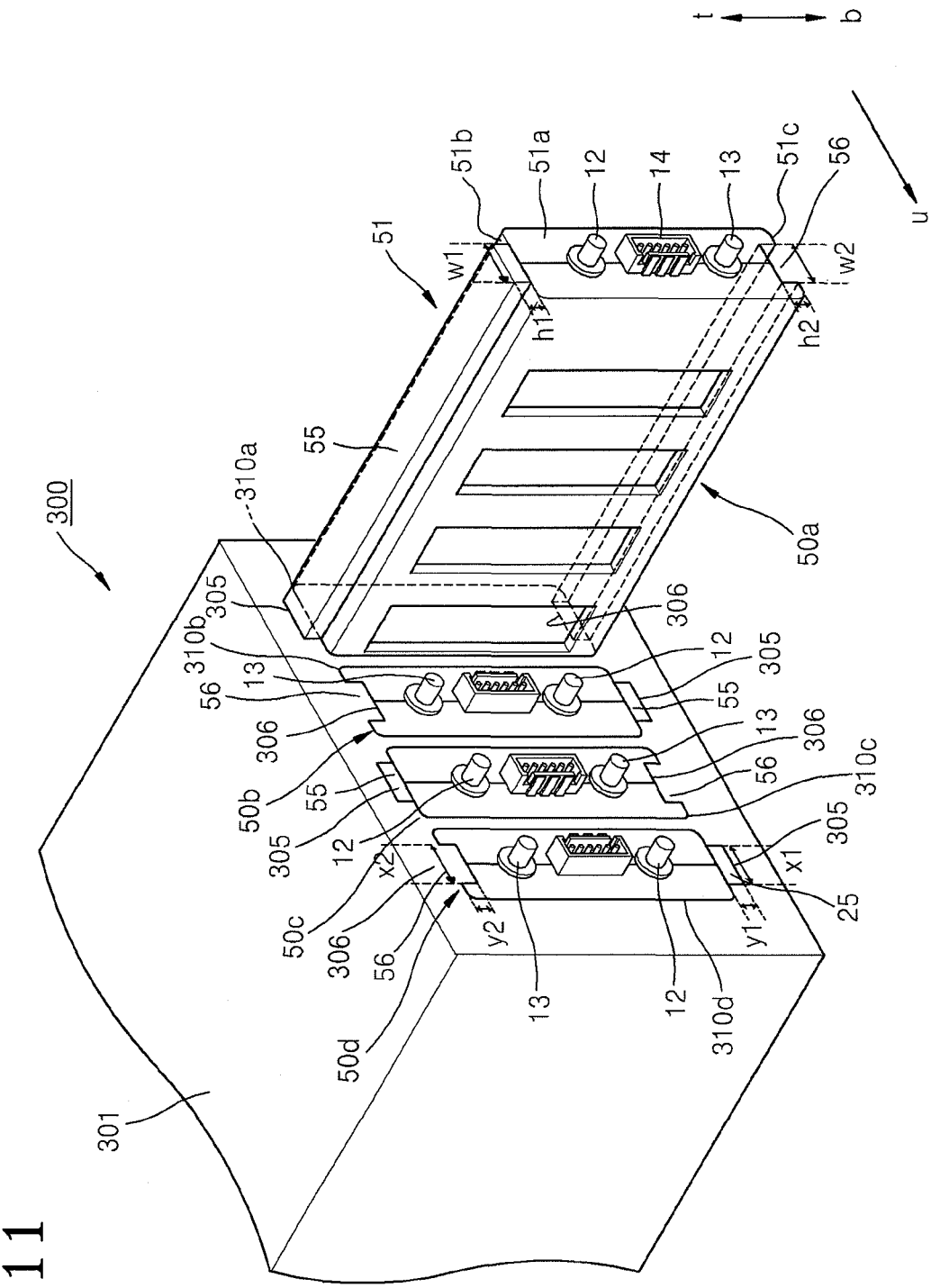
FIG. 11 is a perspective view of a UPS according to another embodiment of the present invention.

FIG. 11 is a perspective view of a UPS 300 according to another embodiment of the present invention. Referring to FIG. 11, the UPS 300 according to the present embodiment includes a housing 301 and battery packs 50a, 50b, 50c, and 50d.

The housing 301 includes storage units 310a, 310b, 310c, and 310d housing the battery packs 50a, 50b, 50c, and 50d, respectively. Each of the storage units 310a, 310b, 310c, and 310d includes a third attachment unit 305 and a fourth attachment unit 306. The third attachment units 305 and the fourth attachment units 306 are attached to first attachment units 55 and second attachment units 56 of the battery packs 50a, 50b, 50c, and 50d, respectively. The third attachment units 305 are formed to be attached to the first attachment units 55, whereas the fourth attachment units 306 are formed to be attached to the second attachment units 56. Referring to FIG. 11, the first attachment units 55 protrude outwardly from the second surfaces 51b of the casings 51, respectively, whereas the second attachment units 56 are sunken inwardly from the third surfaces 51c of the casings 51, respectively.

Therefore, the third attachment units 305 are sunk into the housing 301 in correspondence to the shapes of the first attachment units 55, whereas the fourth attachment units 306 protrude outwardly from the housing 301 in correspondence to the shapes of the second attachment units 56. A width x1 and a height y1 of each of the third attachment units 305 is the same as a width w1 and a height h1 of each of the first attachment units 55, and a width x2 and a depth y2 of each of the fourth attachment units 306 is the same as a width w2 and a height h2 of each of the second attachment units 56. However, aspects of the present invention are not limited thereto. For example, the width x1 and the depth y1 of each of the third attachment units 305 may be respectively greater than the width w1 and the height h1 of each of the first attachment units 55, and the width x2 and the depth y2 of each of the fourth attachment units 306 may be respectively greater than the width w2 and the height h2 of each of the second attachment units 56. Thus, the first attachment units 55 and the second attachment units 56 are easily attached to the third attachment units 305 and the fourth attachment units 306, respectively.

The third attachment units 305 and the fourth attachment units 306 of the storage units 310a, 310b, 310c, and 310d are arranged to face different directions. In detail, the third attachment unit 305 of the storage unit 310a faces the upward direction t of the housing 301, whereas the fourth attachment unit 306 of the storage unit 310a faces the downward direction b of the housing 301. On the other hand, the third attachment unit 305 of the storage unit 310b, which is adjacent to the storage unit 310a, faces the downward direction b of the housing 301, whereas the fourth attachment unit 306 of the storage unit 310b faces the upward direction t of the housing 301. As such, third and fourth attachment units 305 and 306 of adjacent storage units 310a, 310b, 310c and 310d are disposed so as to face opposite directions. In other words, the third attachment units 305 and the fourth attachment units 306 are alternately arranged to face the upward direction t, whereas the fourth attachment units 306 and the third attachment units 305 may be alternately arranged to face the downward direction b.

As described above, in the UPS 300, according to the present embodiment, the third attachment units 305 and the fourth attachment units 306 have different shapes and are alternately arranged. Thus the upper ends and the lower ends of the battery packs 50a, 50b, 50c, and 50d are alternately arranged. Therefore, the first and second terminals 12 and 13 having opposite polarities are alternately arranged. In other words, the first attachment unit 55 and the second attachment unit 56 of the battery pack 50a are respectively attached to the third attachment unit 305 and the fourth attachment unit 306. Thus the battery pack 50a is arranged such that the first terminal 12 is disposed above a data communication terminal 14 in the upward direction t and the second terminal 13 is disposed below the data communication terminal 14 in the downward direction b. As such, first and second attachment units 55 and 56 of adjacent battery packs 50a, 50b, 50c and 50d are disposed so as to face opposite directions.

Therefore, in the UPS 300 according to the present embodiment, the first terminals 12 and the second terminals 13 of each of the battery packs 50a, 50b, 50c, and 50d respectively housed in the storage units 310a, 310b, 310c, and 310d are alternately arranged so that the second terminals 13 and the first terminals 12 of adjacent ones of the battery packs 50a, 50b, 50c, and 50d are disposed on alternating sides of respective data communication terminals 14.

Accordingly, in the UPS 300, according to the present embodiment, due to the differences in the shapes and arrangements of the first through fourth attachment units 55, 56, 305, and 306 as described above, the battery packs 50a, 50b, 50c, and 50d are housed in the housing 301 such that the polarities of the terminals 12 and 13 of the battery packs 50a, 50b, 50c, and 50d are alternately arranged. Therefore, the battery packs 50a, 50b, 50c, and 50d are easily housed in the housing 301 without confirming polarities of each of the battery packs 50a, 50b, 50c, and 50d. Furthermore, the battery packs 50a, 50b, 50c, and 50d are prevented from being housed in the housing 301 such that the terminals 12 and 13 having the same polarity are arranged adjacent to each other. Thus, electric shorts due to incorrect connection of terminals having the same polarity is prevented.

As described above, according to the one or more of the above embodiments of the present invention, electrical shorts due to incorrect arrangement of polarities during attachment of a plurality of battery packs is prevented.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
   a casing housing a plurality of cells;
   first and second terminals arranged to protrude outwardly from a first surface of the casing and having opposite polarities;
   a first attachment unit formed on a second surface of the casing; and
   a second attachment unit formed on a third surface of the casing, disposed opposite the second surface of the casing,
   wherein the first attachment unit and the second attachment unit have different dimensions.

2. The battery pack of claim 1, wherein the first attachment unit protrudes outwardly from the second surface of the casing, and
   wherein the second attachment unit protrudes outwardly from the third surface of the casing.

3. The battery pack of claim 2, wherein the first attachment unit and the second attachment unit have different shapes or different sizes.

4. The battery pack of claim 3, wherein a width of the first attachment unit is different from a width of the second attachment unit.

5. The battery pack of claim 4, wherein the width of either of the first attachment unit or the second attachment unit is greater than the width of the other of the first attachment unit or the second attachment unit.

6. The battery pack of claim 3, wherein a height of the first attachment unit is different from a height of the second attachment unit.

7. The battery pack of claim 6, wherein the height of either of the first attachment unit or the second attachment unit is greater than the height of the other of the first attachment unit or the second attachment unit.

8. The battery pack of claim 1, wherein the first attachment unit is a groove in the second surface, and
   wherein the second attachment unit is a groove in the third surface.

9. The battery pack of claim 8, wherein the first attachment unit and the second attachment unit have different shapes or different sizes.

10. The battery pack of claim 9, wherein a depth of either of the first attachment unit or the second attachment unit is greater than a depth of the other of the first attachment unit or the second attachment unit.

11. The battery pack of claim 9, wherein a width of either of the first attachment unit or the second attachment unit is greater than a width of the other of the first attachment unit or the second attachment unit.

12. The battery pack of claim 1, wherein the first attachment unit protrudes outwardly from the second surface, and
   wherein the second attachment unit is a groove in the third surface.

13. The battery pack of claim 1, wherein the first attachment unit is a groove in the third surface, and
   wherein the second attachment unit protrudes outwardly from the third surface.

14. An uninterruptible power supply (UPS) comprising:
   at least one battery pack, each battery pack comprising:
      a casing housing a plurality of cells;
      first and second terminals that are arranged to protrude outwardly from a first surface of the casing and having opposite polarities;
      a first attachment unit formed on a second surface of the casing; and
      a second attachment unit formed on a third surface of the casing, disposed opposite the second surface of the casing,
      wherein the first attachment unit and the second attachment unit have different dimensions; and
   a housing comprising at least one storage unit housing the battery pack,
   wherein the at least one storage unit comprises third attachment units and fourth attachment units, and
   wherein the third attachment units and the fourth attachment units are respectively attached to the first and second attachment units and hold the battery pack.

15. The UPS of claim 14, wherein adjacent ones of the third attachment units of the storage units face different directions.

16. The UPS of claim 14, wherein one of the third attachment units of one of the storage units and one of the fourth attachment units of another one of the storage units, which is adjacent to the one of the storage units, face the same direction.

17. The UPS of claim 14, wherein the first attachment unit protrudes outwardly from the second surface of the casing,
   wherein the second attachment unit protrudes outwardly from the third surface of the casing,
   wherein the third attachment units are sunk into the housing in correspondence to the first attachment, such that the third attachment unit is attachable to the first attachment unit, and
   wherein the fourth attachment units are sunk into the housing in correspondence to the second attachment, such that the fourth attachment units are attachable to the second attachment unit.

18. The UPS of claim 17, wherein a width of the first attachment unit is different from a width of the second attachment unit.

19. The UPS of claim 17, wherein a height of the first attachment unit is different from a height of the second attachment unit.

20. The UPS of claim 14, wherein the first attachment unit is a groove in the second surface,
   wherein the second attachment unit is a groove in the third surface,
   wherein the third attachment units protrude outwardly from the housing in correspondence to the first attachment, such that the third attachment units are attachable to the first attachment unit, and
   wherein the fourth attachment units protrude outwardly from the housing in correspondence to the second attachment, such that the fourth attachment units are attachable to the second attachment unit.

21. The UPS of claim 20, wherein a depth of the first attachment unit is different from a depth of the second attachment unit.

22. The UPS of claim 20, wherein a width of the first attachment unit is different from a width of the second attachment unit.

23. The UPS of claim 14, wherein the first attachment unit protrudes from the second surface,
   wherein the second attachment unit is a groove in the third surface,
   wherein the third attachment units are sunk into the housing in correspondence to the first attachment, such that the third attachment units are attachable to the first attachment unit, and
   wherein the fourth attachment units protrude outwardly from the housing in correspondence to the second attachment, such that the fourth attachment units are attachable to the second attachment unit.

24. The UPS of claim 14, wherein the first attachment unit is a groove in the second surface,
   wherein the second attachment unit protrudes outwardly from the third surface,
   wherein the third attachment units protrude outwardly from the housing in correspondence to the first attachment, such that the third attachments unit are attachable to the first attachment unit, and
   wherein the fourth attachment units are sunk into the housing in correspondence to the second attachment, such that the fourth attachment units are attachable to the second attachment unit.

25. The battery pack of claim 1, wherein the first attachment unit and the second attachment unit secure the battery pack into a housing of an uninterruptible power supply (UPS) by respectively attaching to third and fourth attachment units of the housing.

* * * * *